T. S. YORK.
DEMOUNTABLE WHEEL RIM.
APPLICATION FILED DEC. 16, 1916.

1,268,798.

Patented June 4, 1918.
2 SHEETS—SHEET 1.

Inventor.
Timothy S. York

T. S. YORK.
DEMOUNTABLE WHEEL RIM.
APPLICATION FILED DEC. 16, 1916.
1,268,798.
Patented June 4, 1918.
2 SHEETS—SHEET 2.
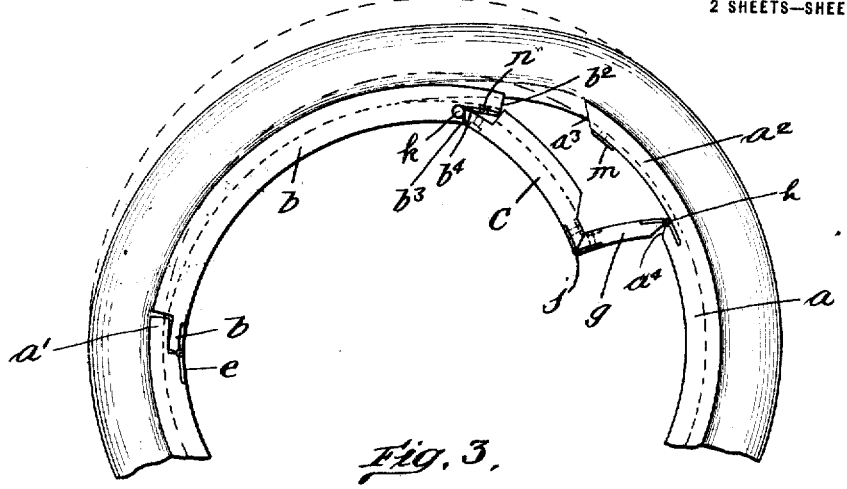
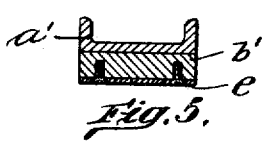
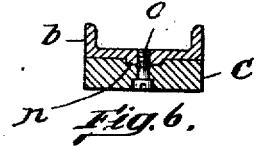
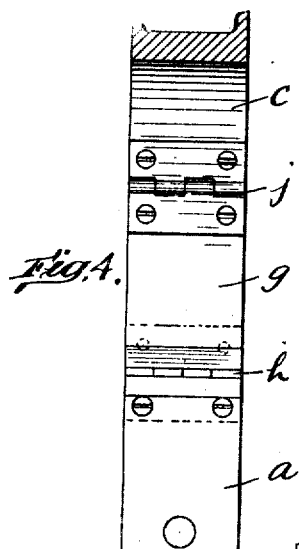
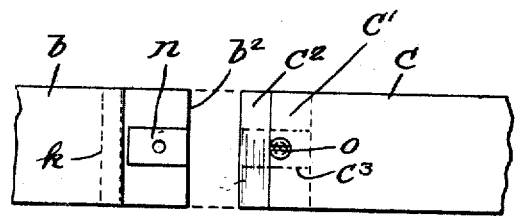
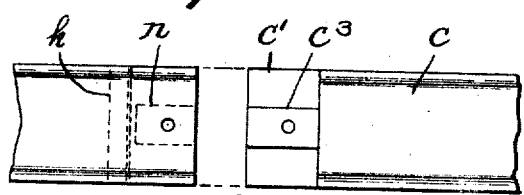
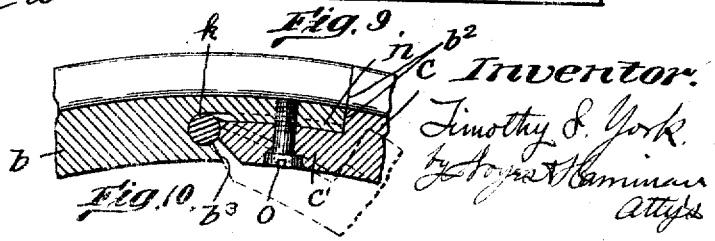

UNITED STATES PATENT OFFICE.

TIMOTHY S. YORK, OF HAVERHILL, MASSACHUSETTS, ASSIGNOR TO LOUIS H. HARRIMAN, OF HAVERHILL, MASSACHUSETTS, TRUSTEE FOR SAID YORK, W. SCOTT PETERS, SAMUEL E. CASS, AND FRANK M. WHITEHOUSE, ALL OF HAVERHILL, MASSACHUSETTS.

DEMOUNTABLE WHEEL-RIM.

1,268,798.     Specification of Letters Patent.     Patented June 4, 1918.

Application filed December 16, 1916. Serial No. 137,295.

*To all whom it may concern:*

Be it known that I, TIMOTHY S. YORK, a citizen of the United States, residing at Haverhill, in the county of Essex and State of Massachusetts, have invented an Improvement in Demountable Wheel-Rims, of which the following is a specification.

This invention relates to that class of demountable rims for automobile wheels in which the tire is retained in position thereon by side flanges which project radially and form an annular groove in the outer surface of the rim, and in which means are provided for reducing its diameter at certain points, to permit the tire to be placed thereon and to be removed.

The object of my invention is to provide a demountable rim, of the above-described character, in which a portion thereof may be readily collapsed, when the rim is demounted, to permit the tire to be easily put on and removed, and which will enable the rim to be expanded after the tire has been placed thereon, so that it may be stretched tightly thereon, the construction being such that when the rim is on the wheel it will be practically as rigid as if it were of integral construction throughout.

I accomplish this object by the means shown in the accompanying drawings, in which a preferred embodiment of my invention is shown, and in which:—

Figs. 2 and 3 are similar views showing the parts in different positions.

Fig. 4 is a detail view of a portion of the inner periphery of the rim.

Figure 1:
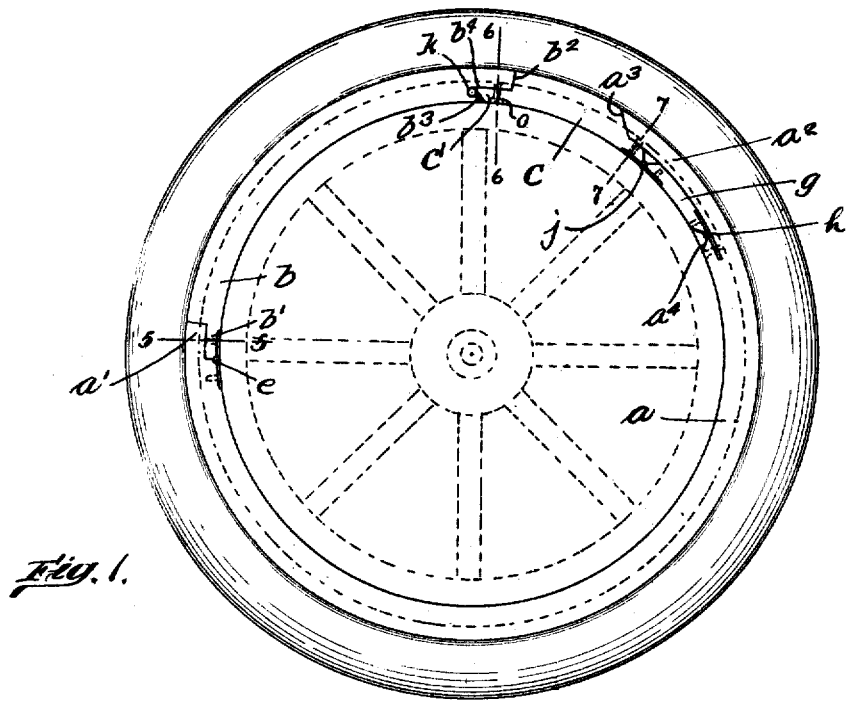
Figure 1 is a side elevation showing the parts in normal position.

Figs. 5, 6, and 7 are transverse sectional views on the lines 5—5, 6—6, and 7—7, respectively, of Fig. 1.

Figs. 8 and 9 are detail views of the inner and outer sides, respectively, of the end-portions of the two connecting sections.

Fig. 10 is a detail sectional view, longitudinally of the rim, of the end-portions of the two abutting sections.

According to my invention the complete rim is composed of three abutting sections, $a$, $b$ and $c$, each being of integral construction, and having the usual tire-receiving groove in the outer peripheral surfaces thereof. For convenience in description, the section $a$, which preferably extends throughout approximately two-thirds of the circumference, or more than a semi-circumference, together with the section $b$, which, as hereinafter described, is hinged to one end of said section $a$, are hereinafter termed the "main section", the section $b$, in function, being merely an inwardly yieldable end-portion of the section $a$. The section $c$ is termed the "complemental section", as it fills in or spans the space between the ends of the main rim-portion.

As shown in the drawing, the section $b$ has a lap joint connection with section $a$, an end-portion $b'$, on said section $b$, being extended within a corresponding overlapping portion $a'$, on section $a$, each abutting against corresponding shoulders on the other, and the portion $b'$ being connected at its end to the adjacent portion of section $a$, against which it abuts, by a hinge $e$ arranged to permit the section $b$ to swing inward, the pivot of said hinge being arranged practically at the inner periphery of the rim, and in transverse relation. The opposite end-portion $a^2$, of the section $a$, has an oblique end face $a^3$, and is recessed at its inner side, the bottom of said recess extending to an oblique shoulder $a^4$. A link $g$ is connected at one end to the section $a$ at its shoulder $a^4$, by a hinge $h$, the pivot of which is located at the vertex of the angle between the shoulder $a^4$ and the bottom of said recess, or the inner side of the end-portion $a^2$, said link being of the same depth and width as said recess, so that, when said link is held against the end portion $a^2$, it will form a continuation of the sides and inner periphery of the rim. The hinged end of link $g$ is arranged to extend divergently with relation to the shoulder $a^4$, from the hinge $h$, so that said link may swing inwardly to a suitable extent. The complemental rim-section $c$ is connected at one end, by a hinge $j$, to the opposite end of link $g$, the pivot of which is at the inner periphery of the rim, the adjacent ends of said section and link extending divergently from said pivot, to permit section $c$ to be swung oppositely on the hinge $j$ to the direction in which the link may be swung on hinge $h$. The length of the link $g$ is somewhat less than the length of the recess formed within the end-portion $a^2$, and the section $c$ is formed with a reduced portion at its hinged end which is adapted to occupy the portion of said recess not occupied by said link, so that said portion $a^2$ overlaps both link $g$ and section $c$, the latter also having an inclined shoulder adapted to fit against the end face $a^3$, when in normal position. The free end-portion of the section $b$ is recessed on its inner side to receive a tongue $c'$ on the section $c$, said end-portion being formed to provide end shoulders $b^2$, $b^3$, the inner shoulder $b^3$ being extended obliquely to a radius to form an acute angle between it and the longitudinal face $b^4$, which extends between said shoulders, and in the vertex of which a round pin or bearing $k$ is arranged in transverse position, so that a portion, slightly less than half, of its circumference, is exposed. The adjacent or free end of said section $c$ is correspondingly formed, except that the angle between its oblique end shoulder $c^2$, and its longitudinal face $c^3$ is somewhat less than the angle between the faces $b^2$ and $b^3$, to permit limited swinging movement between the latter, said section $c$ also having a concaved seat $c^4$ at its end arranged to fit against the bearing pin $k$.

The inner side of the end-portion $a^2$ is provided with a longitudinally and inwardly extending lug $m$ in the middle thereof, and the adjacent sides of the section $c$ and link $g$ are grooved to receive said lug to hold them against relative lateral strain. The inner side of the face $b^4$ is also provided with a similarly disposed lug $n$ which is arranged to be received in a corresponding groove in the face $c^3$ of the section $c$. A locking screw $o$ is arranged to extend from the inner side of the rim through the end-portion of section $c$, which is overlapped by the end-portion of section $b$, and to be threaded into the latter, and in like manner, a screw $p$ is arranged to extend through the opposite end-portion of said section $c$, adjacent its hinge connection with link $g$, and into the end-portion $a^2$ of section $a$ to lock said sections rigidly together. In like manner a screw $p'$ may be employed at the joint between the sections $a$ and $b$ for general strengthening purposes.

In addition to giving increased rigidity to the parts and providing means to relieve the joints and connecting hinges from transverse strain, the screw or bolt $o$, which locks the end of the section $c$ to the section $b$, is further advantageous in case the tire should be torn from the rim, while on the wheel, as it would prevent longitudinal separation of the members $b$ and $c$ and possible dislodgment of the rim from the wheel on which it is mounted.

Figure 2:
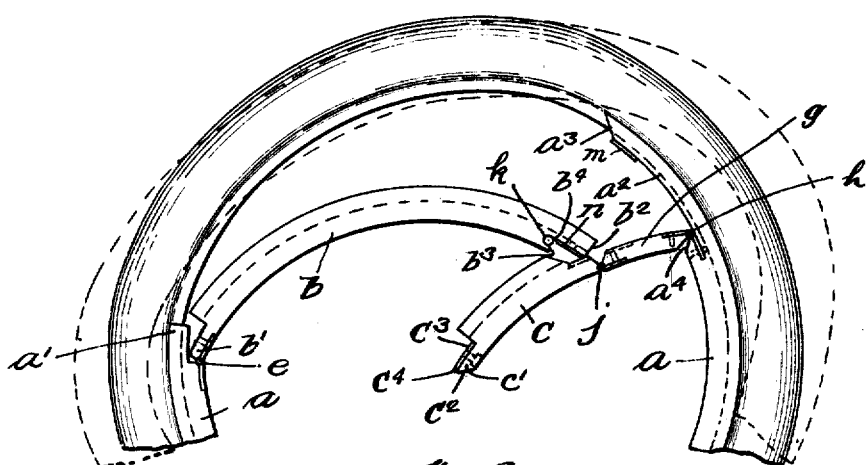

Before the tire is placed on the rim, the toggle formed by link $g$ and section $c$ is "broken," or said parts are drawn inward at their point of connection, thus disengaging section $c$ from the end of section $b$, so that it may be swung inward, and then the section $b$ is swung inward against the toggle, as illustrated in Fig. 2, thus reducing the diameter of the rim at this point. The tire is then placed in position on the section $a$, and, by pressing in the portion of the tire adjacent the hinged sections, the portions of the tire adjacent the ends of the section $a$ will be sprung outwardly sufficiently to permit the tire to be easily placed in position in the groove of said section $a$, as indicated by the dotted and full line positions of Fig. 2. The section $b$ is then swung outwardly against the inner side of the tire and the section $c$ is swung outwardly, while the link $g$ is held in its inward position, so that said sections and link are held at an angle, then the concave seat $c^4$ of the section $c$ is placed against the bearing pin $k$, so that the parts are held in the position of Fig. 3. Then outward pressure is applied to the end of link $g$, so that it is swung toward the end-portion $a^2$, thereby causing the section $c$ to be pushed longitudinally against the end of section $b$, as it is swung outwardly toward the tire, and, at the same time, causing the section $b$ to be pressed outwardly and forced firmly against the tire, so that the ends of the section $a$, which is preferably of somewhat resilient material, are sprung apart by the toggle action of the section $c$ and link $g$, the whole rim being pressed out to its normal position, by the time the toggle is straightened or pressed against the end-portion $a^2$, causing the tire to be stretched tightly thereon, by a strong leverage action. As the toggle joint is pressed outwardly it becomes straightened just before the link $g$ is swung against the end-portion $a^2$, that is, when the axial line of the hinge $j$, which connects said link to the section $c$, passes the straight line extending from the axis of the hinge $h$ to the axis about which the opposite end of section $c$ is swinging, located at the center of the bearing pin $k$, at which point the stretching effect on the tire due to the toggle action, is at its maximum. It follows, therefore, that the toggle will be outwardly actuated by the resilience of the tire during the remainder of its outward swinging movement, and will thus be held pressed firmly against the end-portion $a^2$, when in normal position, by the resilience of the tire, said end-portion thus acting to prevent the toggle from being forced out beyond an exactly concentric position. In removing the tire it will therefore be necessary to force the toggle joint inward against the contracting action of the tire, so that the latter will have to be slightly stretched up to the point where the three joints of the toggle are in line, or the point where the toggle is exactly straight.

It will be noted that the inclination of the end face $a^3$ is toward the pivot $h$ of the link $g$, and at such an angle that the section $c$ is pushed in a direction nearly parallel thereto, as its correspondingly inclined face is swung toward it, so that said faces slide into engagement as the section is finally pushed into normal position.

While the tire, by its resilience, will hold the parts in the normal position of Fig. 1, and while the danger of displacement of the parts is comparatively slight, the construction permits the joints to be materially strengthened after the tire has been stretched on the rim and before it has been placed on the wheel, as by passing screws through the overlapping portions of the joints from the inner side of the rim. As shown in Figs. 6, 7 and 10 screws $o$ and $p$ are passed through the section $c$ adjacent its ends, into the rim-end-portions $b^2$ and $a^2$, respectively. A construction is thus provided which is, for all practical purposes, as rigid as a continuous rim.

While the rim members $a$ and $b$ may be made of resilient material and the joint therebetween might, under these conditions, be omitted, in the case of a very light rim, yet in practice such an arrangement is not considered desirable, for the reason that such rims are easily bent out of shape. The invention is, therefore, particularly advantageous in connection with a heavy, rigid, or non-resilient rim in which the main rim portion is divided into two members and connected by a hinged joint at some point at a substantial distance from the ends thereof, as shown, so that this portion may be collapsed to a sufficient extent to permit a heavy tire to be easily placed thereon.

As the end-portion $a^2$ extends over, or overlaps the joint or hinge $j$ between the link $g$ and rim section $c$, it also effectively prevents inward pressure on the rim opposite said hinge, which would be caused by inflation of the tires, from causing the toggle to be forced inward at its joint $j$.

I claim:—

1. A wheel rim having a peripheral tire-receiving groove, and comprising a main rim-portion having an inwardly yieldable end-portion, a complemental rim-section adapted to span the space between the ends of said main rim-portion and, at one end, pivotally to engage the corresponding end thereof, a link having its ends pivotally engaged with said complemental section and said main rim-portion respectively adjacent the opposite ends thereof, to form an inwardly breaking toggle, and means, on the end-portion of the main rim-portion with which the toggle is engaged, to hold the same against outward swinging movement at a predetermined point.

2. A wheel rim having an exteriorly disposed, tire-receiving groove and comprising a main rim-portion and a complemental rim-section, a link connected at one end to said complemental section, and at the other to said main rim-portion adjacent one end thereof, and arranged to permit inward swinging of said complemental section when the opposite end of the latter from said link is in position to engage the main rim-portion at its opposite end from that to which said link is connected, said main rim-portion having an extension rigid therewith and overlapping said link, and locking means arranged to engage said extension and said complemental section to hold the latter in normal position.

3. A wheel rim having an exteriorly disposed, tire-receiving groove and comprising a main rim-portion, having an inwardly yieldable end-portion, and a complemental rim-section, said complemental section having a pivotal bearing seat interposed between one end thereof and one end-portion of said main rim-portion, and having a link connection between the opposite end thereof, and the opposite end-portion of said main rim-portion, forming a toggle arranged to break inwardly when said complemental section is in normal position, said main rim-portion having a rigid extension exteriorly overlapping said link to hold the same against outward swinging movement beyond a position in which the toggle is straightened.

4. A wheel rim having an exteriorly disposed, tire-receiving groove and comprising a main rim-portion having one end-portion thereof recessed from its inner periphery, and forming a transverse shoulder extending from the inner peripheral surface thereof to the bottom of said recess, a link having one end pivotally engaged with said shoulder at the bottom of said recess and adapted to be held against said bottom when in normal position, and a complemental rim-section pivotally connected at one end to the opposite end of said link and adapted to be engaged at its opposite end with the opposite end of said main rim-portion, said pivotal connection with said link permitting swinging movement thereof away from the bottom of said recess to disengage said complemental section from said main rim-portion by a longitudinal movement.

5. A wheel rim having an exteriorly disposed, tire-receiving groove and comprising a main rim-portion having one end-portion thereof recessed from its inner periphery, and forming a transverse shoulder extending from the inner peripheral surface thereof to the bottom of said recess, and said end-portion having an end face extending obliquely inward toward said shoulder, a link pivotally connected at one end to said rim-portion at said shoulder and adapted to be swung into said recess, a complemental rim-section pivotally connected at one end to the opposite end of said link and having a shoulder at its pivotally connected end corresponding in inclination to said end face, said parts being constructed to permit the free end of said complemental section to be forced longitudinally into engagement with the opposite end portion of said main rim-portion, to carry its said shoulder into engagement with said end face as the link is swung into said recess.

6. A wheel rim having a peripheral tire-receiving groove, and comprising a main rim-portion having an inwardly yieldable end-portion and a complemental rim-section adapted to span the space between the ends of said main rim-portion, a link having its ends pivotally engaged with one end of said complemental section and the corresponding end of said main rim-section respectively, and arranged to form, with said complemental section, an inwardly breaking toggle, the opposite ends of said main rim-portion and said complemental section having corresponding recessed and projecting portions constructed to permit the end of the complemental section to be seated against the end of the main rim-portion, and then to be swung transversely into position, while seated, by outward pressure on the joint of the toggle, and means on the end portion of the main rim-portion, with which the toggle is engaged, to hold the same against outward swinging movement at a predetermined point.

7. A wheel rim having a peripheral tire-receiving groove and comprising a pair of rigid, pivotally connected, main rim-sections and a rigid complemental rim-section having one end portion adapted pivotally to engage the adjacent end portion of one main section and its opposite end-portion extending within the adjacent end portion of the other main section, so that it is overlapped thereby, and a link pivoted, at one end, to the overlapped end of said complemental section and, at its opposite end, to the overlapping main-section at a point sufficiently remote from the end of the latter to permit the link to lie therewithin, thereby to limit the link against outward swinging movement and prevent the application of inward pressure thereon from without the rim.

8. A wheel rim having a peripheral tire-receiving groove and comprising a pair of rigidly, pivotally connected main rim-sections, and a rigid complemental rim-section having one end portion overlapped by the corresponding end portion of one of said main sections and adapted to be pivotally engaged therewith and to be disconnected therefrom, engaging means extending between said overlapping end-portions for locking the same against separation longitudinally of the rim when the parts are in normal position, and a link pivotally connected at one end to the opposite end portion of said complemental section and at its opposite end to the corresponding opposite end portion of the main rim portion at a point somewhat removed from the extreme end of the latter and at the inner side thereof.

9. A wheel rim having a peripheral tire-receiving groove and comprising a pair of rigid, pivotally connected, main rim sections, and a rigid complemental rim-section having each of its end-portions overlapped by the corresponding end-portions of said main sections, a link connected at one end to one end of said complemental section and at its opposite end to the inner side of the corresponding main section end portion at a point removed from the extreme end of the latter, the opposite end of said complemental section being arranged to be pivotally engaged with the corresponding portion of the other main section, to permit the toggle thus formed to be swung into normal position against the adjacent end-portions of said main rim-portion sections.

In testimony whereof, I have signed my name to this specification.

TIMOTHY S. YORK.

Witness:
L. H. HARRIMAN.

Copies of this patent may be obtained for five cents each, by addressing the "Commissioner of Patents, Washington, D. C."